June 17, 1924.

R. A. PHILOW

SHOCK ABSORBER

Filed Feb. 11, 1922

Inventor
Roy A. Philow

By Harry C. Schroeder
Attorney

June 17, 1924.

R. A. PHILOW

SHOCK ABSORBER

Filed Feb. 11, 1922

Inventor
Roy A. Philow
By Harry C. Schrock
Attorney

Patented June 17, 1924.

1,498,291

UNITED STATES PATENT OFFICE.

ROY A. PHILOW, OF SAN FRANCISCO, CALIFORNIA.

SHOCK ABSORBER.

Application filed February 11, 1922. Serial No. 535,792.

*To all whom it may concern:*

Be it known that I, ROY A. PHILOW, a citizen of the United States, residing at San Francisco, in the county of San Francisco and State of California, have invented certain new and useful Improvements in Shock Absorbers, of which the following is a specification.

My invention is a shock absorber for automobiles, particularly applicable to automobiles which are mounted on cantilever springs, but is also applicable to automobiles mounted on other types of springs. The purpose of my invention is to provide a shock absorber of this character which is highly efficient in operation and which will in general improve the riding qualities of the automobile.

Referring to the annexed drawing in which my invention is illustrated and which forms a part of this specification:

Figure 1:
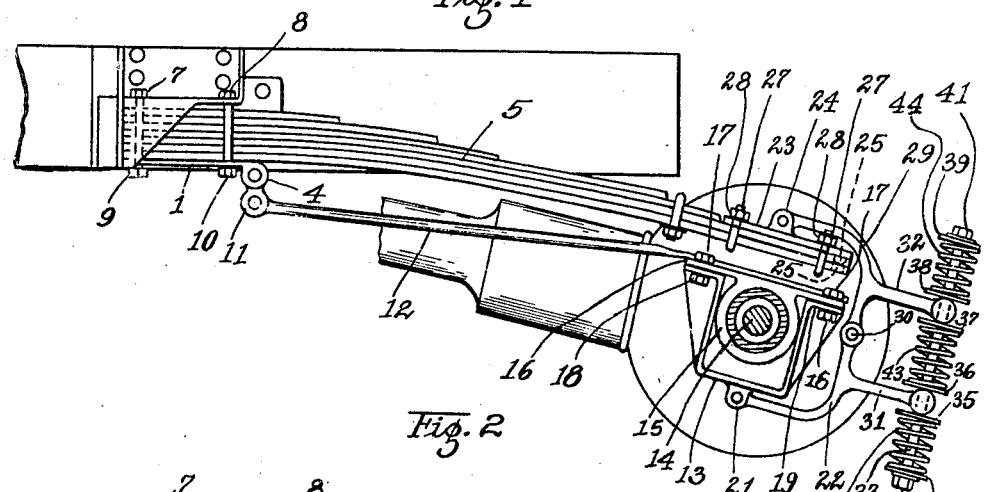
Figure 1 is a side view of my shock absorber applied to the rear axle and cantilever spring of an automobile.
Figure 2:
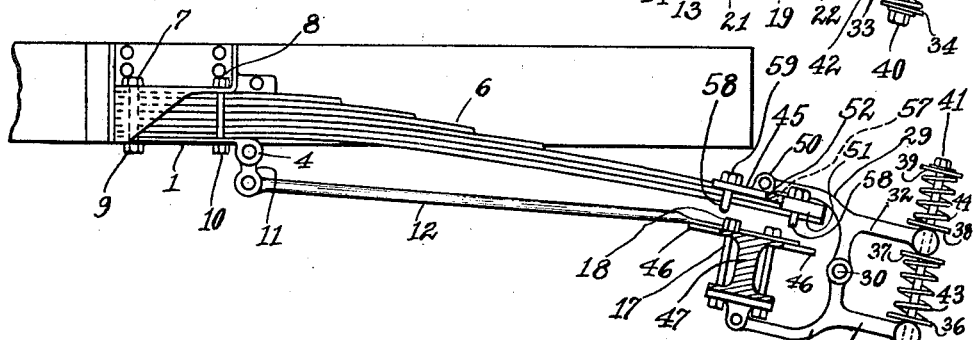
Figure 2 is a side view of my shock absorber applied to the front axle and cantilever spring of an automobile.

Referring to Figures 1 and 2 of the drawing, 1 indicates a radius rod connecting plate which is triangular in shape provided with an aperture 2 in its forward corner and with apertures 3 in its rear corners and formed with depending knuckles 4 at its rear edge. Said plate is secured to the under side of the fixed end of either the rear or front cantilever springs 5 or 6 of an automobile by the bolts 7 and 8 and nuts 9 and 10 which screw on the lower ends of said bolts, which bolts and nuts secure said end of said springs to the automobile body, said bolts 7 and 8 extending through the holes 2 and 3 respectively. A toggle 11 is connected to the knuckles 4 and one end of a radius rod 12 is connected to said toggle.

In the form of my invention shown in Figure 1 a yoke 13 extends upwardly over the rear axle 14 of the automobile and the collar 15 on said axle, and is secured to the flanges 16 of said collar by bolts 17 and nuts 18, which bolts extend through flanges 19 bent outwardly from the upper ends of said yoke. The rear end of radius rod 12 is secured to flange 16 by bolt 17 and nut 18. Knuckles 21 are formed on the under side of the lower member of the yoke 13 to which is pivotally connected one end of an angular lever 22. A spring end connecting plate 23 is formed with knuckles 24 on its upper side, and with an embossment 25 on its lower side at its rear edge and is provided with four holes 26 in its corners respectively. The plate 23 rests upon the rear end of the automobile spring 5, the embossment 25 fitting in a depression 25' in the extremity of said spring whereby the plate is properly positioned on the spring and is prevented from slipping off the end of the spring. U-shaped bolts 27 extend under the spring 5 and upwardly around the side edges thereof and through the holes 26 in plate 23 and nuts 28 screw on the upper ends of said bolts against said plate to hold the plate on the spring. An angular lever 29 is pivotally connected at one end to the knuckles 24, the other end thereof being connected pivotally to the other end of lever 22 by pivot 30. On the levers 22 and 29 are formed rearwardly projecting arms 31 and 32 respectively. A rod 33 extends loosely through the ends of the arms 31 and 32 on which rod are collars 34, 35, 36, 37, 38 and 39. The collars 35 and 36 engage the lower and upper sides respectively of the arm 31. The collars 37 and 38 respectively engage the lower and upper sides of the arm 32. Nuts 40 and 41 screw on the lower and upper ends of the rod 33 respectively against the collars 34 and 39. Springs 42, 43 and 44 surround the rod 33 respectively between the collars 34 and 35, the collars 36 and 37, and the collars 38 and 39, which springs are brought under tension during relative movement of the axle 14 and spring 5.

The form of my invention shown in Fig. 2 is the same as that shown in Fig. 1 with the exception that a spring end plate 45 is substituted for the plate 21 and the flanges 19 of the yoke 13 are bolted by the bolts 17 and nuts 18 to ears 46 on the front axle 47 of the automobile, while the radius rod 12 instead of being connected to the yoke 13 is secured to the ear 46 on the forward side of the front axle 47 by the bolt 17 which extends through said ear and the nut 18 which screws on said bolt.

The plate 45 has a pair of knuckles 50 on its upper side, an embossment 51 on its under side near its forward edge, a rabbet 52 in its under side extending from the rear edge thereof, a notch 53 in its rear edge, a transverse slot 54 midway of its ends and holes 55 in its corners respectively. The forward part of said plate rests upon the forward end of the second leaf of spring 6 and the embossment 51 rests upon the lower leaf while the forward end of the next leaf fits in under the plate in rabbet 52 and is bent upwardly at its forward edges at 57 which fits in slot 54, and the forward end of the next leaf fits in notch 53. U-shaped bolts 58 extend under the spring 6 and upwardly against the side edges thereof through the holes 55 in plate 45 and nuts 59 screw on the upper ends of said bolts against the plate. The rear end of the lever 29 is pivotally connected to the knuckles 50.

Figure 3:
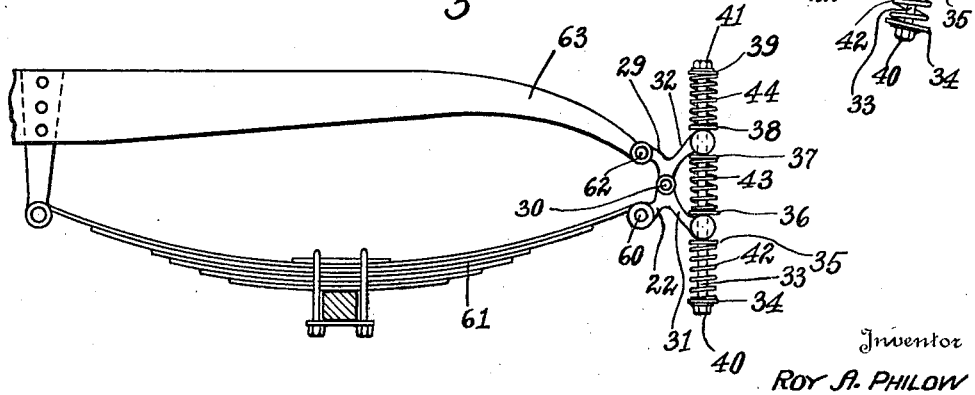
Figure 3 is a side view of my shock absorber applied to a semi-elliptic spring and the chassis of an automobile.
Figure 4:
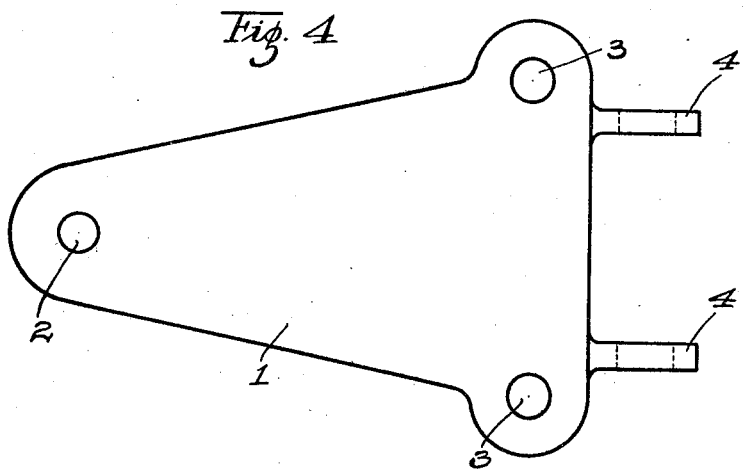
Figure 4 is a plan view of the radius rod connecting plate.
Figure 5:
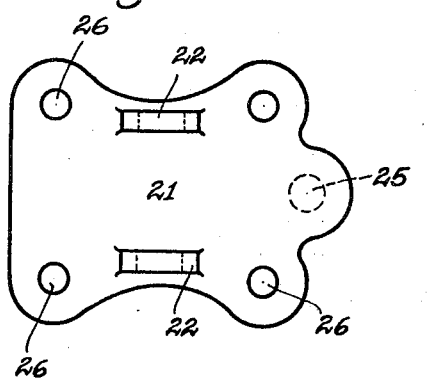
Figure 5 is a plan view of the spring end connecting plate for a rear automobile spring.
Figure 6:
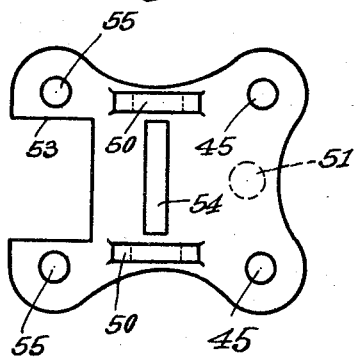
Figure 6 is a plan view of the spring end connecting plate for a front automobile spring.

In the form of my invention shown in Fig. 3 the lever 22 is pivotally connected at 60 to the end of the semi-elliptic spring 61 while the lever 32 is pivotally connected at 62 to the end of the automobile chassis 63. The levers 22 and 29 and their arms 31 and 32 are made in the proper form to be operatively connected to said spring 61 and said chassis 63.

Figure 7:
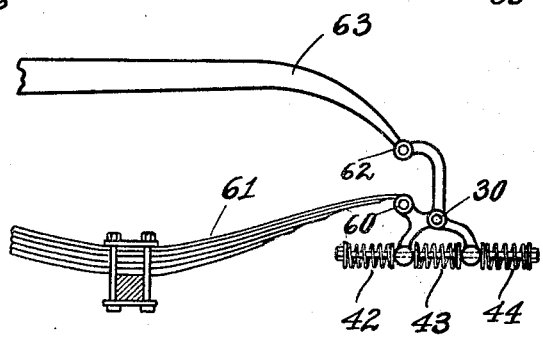
Figure 7 is a side view of a modified form of my shock absorber.

In the modified form shown in Fig. 7, the springs are in a horizontal position with the pivot 30 slightly below the pivot 60.

Having described my invention, I claim:

1. A shock absorber comprising a yoke, means for connecting said yoke around the rear axle of an automobile, a radius rod connected at one end to said yoke, a plate connected to the fixed end of an automobile cantilever spring and to said radius rod, a lever pivotally connected to said yoke, a plate connected to the spring end of said spring, a lever pivotally connected to said latter plate, said levers being pivotally connected to each other, arms extending respectively from said levers, a rod extending loosely through the ends of said arms, a spring surrounding said rod between said arms, two springs on said rod bearing respectively against said arms and collars on the ends of said rod against which the outer ends of said two springs bear respectively.

2. A shock absorber comprising a yoke, means for connecting said yoke around the front axle of an automobile, a plate connected to the fixed end of an automobile cantilever spring, a radius rod connected to said plate and to said front axle, a plate mounted on the spring end of said cantilever spring, the forward part of said plate resting on the end of the lower leaf of said spring, the under side of said plate being rabbeted to receive the next leaf of said spring, and provided with a slot to receive the end of said next leaf, said plate being notched in its rear edge to receive the end of the next leaf of said spring, said plate having holes, U-bolts extending around said spring through the holes in said plate, nuts on the ends of said bolts engaging said plate, a lever pivotally connected to said plate, a lever pivotally connected to said yoke and pivotally connected to said first lever, arms respectively on said levers, a rod projecting loosely through said arms, a spring surrounding said rod between said arms, two springs on said rod bearing respectively against said arms and collars on the ends of said rod against which the outer ends of said two springs bear respectively.

In testimony whereof I affix my signature.

ROY A. PHILOW.